United States Patent [19]

Mossbach

[11] Patent Number: 4,586,484
[45] Date of Patent: May 6, 1986

[54] SPACE HEATER FOR SMALL COMPARTMENTS

[75] Inventor: Wilhelm Mossbach, Kirchseen, Fed. Rep. of Germany

[73] Assignee: Philipp Kreis GmbH & Co. Truma-Geratebau, Putzbrunn, Fed. Rep. of Germany

[21] Appl. No.: 638,889

[22] Filed: Aug. 8, 1984

[30] Foreign Application Priority Data

Aug. 8, 1983 [DE] Fed. Rep. of Germany ....... 3328591

[51] Int. Cl.⁴ .............................................. F24C 3/00
[52] U.S. Cl. .................. 126/91 R; 126/85 R
[58] Field of Search .................... 126/91 R, 85 R, 118

[56] References Cited

U.S. PATENT DOCUMENTS

| | | | |
|---|---|---|---|
| 3,399,661 | 9/1968 | Kreis | 126/118 |
| 3,504,850 | 4/1970 | Mossbach | 126/118 |
| 3,870,052 | 3/1975 | Patrick et al. | 126/91 R |
| 4,421,095 | 12/1983 | Kreis | 126/91 R |

*Primary Examiner*—Carroll B. Dority, Jr.
*Attorney, Agent, or Firm*—Karl F. Ross; Herbert Dubno

[57] ABSTRACT

A space heater for small compartments in which the burner is received in an upwardly open tray bottom which has an outwardly extending flange connected to an outwardly extending flange at the lower end of the combustion chamber. The tray has a lateral opening for the combustion air thereby eliminating the need to go through the floor with a pipe forming a combustion air intake.

10 Claims, 3 Drawing Figures

SPACE HEATER FOR SMALL COMPARTMENTS

FIELD OF THE INVENTION

My present invention relates to a space heater for small compartments, and, more particularly, to a space heater for recreational vehicles, mobile homes, vehicle compartments and ship cabins.

BACKGROUND OF THE INVENTION

Space heaters for small compartments and especially for the applications mentioned above have been provided heretofore with an upwardly extending combustion chamber which opens into a flue-gas passage serving as a heat exchanger with the ambient air and having a downwardly extending portion terminating in an outlet for the flue gases. A combustion device, e.g., a burner, can be provided at the base of the combustion chamber. Conventional space heaters of this type thus define a combustion chamber, which is isolated from the ambient air, and may have a combustion air pipe opening upwardly into the device from the bottom. As a consequence, if the available air feed to this inlet is horizontal, the requirement that the inlet open into the bottom of the combustion chamber from directly below the combustion chamber via the upwardly extending portion of the tube, necessitates a comparatively high heating structure.

The outlet previously mentioned can be connected to a chimney or stack or can open directly through the wall of the chamber to be heated.

Problems are encountered in the event the hole cannot be made in the floor of the chamber at the proper location to communicate with the air inlet and where it may be desired to move the heater from one place to another which may not have facilities for such a hole.

In some cases, moreover, it will not even be possible to provide a feed from below to the space heater. This is usually the case in ship cabins and many vehicle cabins.

When the combustion-air feed is from directly below the combustion chamber, a relatively low-lying burner must be provided and the heating surface expansion and contraction phenomenon then extends practically to the floor of the cabin, creating problems with sealing and safety. Furthermore, low-lying portions of the heating surface are generally less effective than heating surfaces disposed well above the floor.

OBJECTS OF THE INVENTION

It is the principal object of the present invention to provide a space heating device for small compartments, e.g. compartments of the type described, in which the disadvantages of earlier systems as outlined above are obviated.

Another object of this invention is to provide a space heater in which the combustion and flue-gas passages can be independent of the orientation and position of the heater, thereby facilitating installation and assembly and minimizing problems with respect to maintenance and repair.

Yet another object of the invention is to provide a space heater having improved heating efficiency over earlier systems.

SUMMARY OF THE INVENTION

These objects and others which will become apparent hereinafter are attained, in accordance with the present invention, in a space heater of the class described and for the purpose described in which the combustion member is bounded at its lower end by a seating flange whereby the combustion chamber and the flue-gas passage can be supported on an outwardly extending flange of a tray bottom which closes the lower end of the combustion chamber and is provided with means for receiving a burner. This tray bottom and, preferably, also the defining wall of the combustion chamber are provided with a lateral opening to which an air supply pipe can be connected. Advantageously, the flange of the bottom can be mounted upon spaced-apart holes which thus serve to support the space heater upon a mounting plate which can rest on the floor of the chamber to be heated. By forming the bottom of the heater as an upwardly open tray having a peripheral outwardly extending flange which can be sealingly connected to the flange of the combustion chamber by conventional flange-bolting techniques, the connecting sleeve or fitting for the air-feed pipe can be provided directly on this tray. Since the tray can be oriented in any desired manner about the axis of the flanges relative to the combustion chamber, the desired relative orientations of the flue-gas outlet of the combustion air inlet can be assured.

The mounting and orientation of the heating unit is thus largely independent of any floor or wall holes for the air feed. Of course, the air feed inlet and flue-gas outlet can be constructed and arranged so that the air feed and flue-gas discharge pipes or ducts can be provided a common outer wall box, housing, or body and connected to the inlet and outlet fitting collectively.

The tray bottom of the invention positions the heating surface well above the floor and thereby increases the heating effectiveness of the unit.

Because the tray is located below the burner, sealing difficulties with respect to the surrounding compartments are avoided.

According to a feature of the invention, the burner is mounted in the heating tray or pan which can be supported with the burner from the walls of the heater merely by separating the bolted connections of the flanges. This has been found to greatly simplify assembly, repair and mounting of the device.

According to a feature of the invention the pan or tray is provided with centering elements for positioning and anchoring the burner. It has been found to be advantageous, moreover, to have the tray and the wall of the combustion chamber housing define the opening in which a gas feed connecting sleeve is mounted.

While the tray can have a portion adapted to be seated directly on the ground. I have found it to be advantageous to support the interconnected flanges on a plurality of posts or other supports rising from a base plate and which, in turn, can rest upon the ground. The base plate can have one or more closable openings or knockouts to control air flow into the compartment to be heated. A viewing glass for the flame in the combustion chamber can be mounted upon the combustion chamber and can be inclined.

BRIEF DESCRIPTION OF THE DRAWING

The above and other objects, features and advantages of the present invention will become more readily apparent from the following description, reference being made to the accompanying drawing in which:

FIG. 1 is a side-elevational view of a space heater according to the invention, partly broken away and in somewhat diagrammatic form with respect to the showing of the ribs and other parts whose dimensions make them difficult to illustrate completely on the scale to which FIG. 1 is drawn;

SPECIFIC DESCRIPTION

Figure 1:
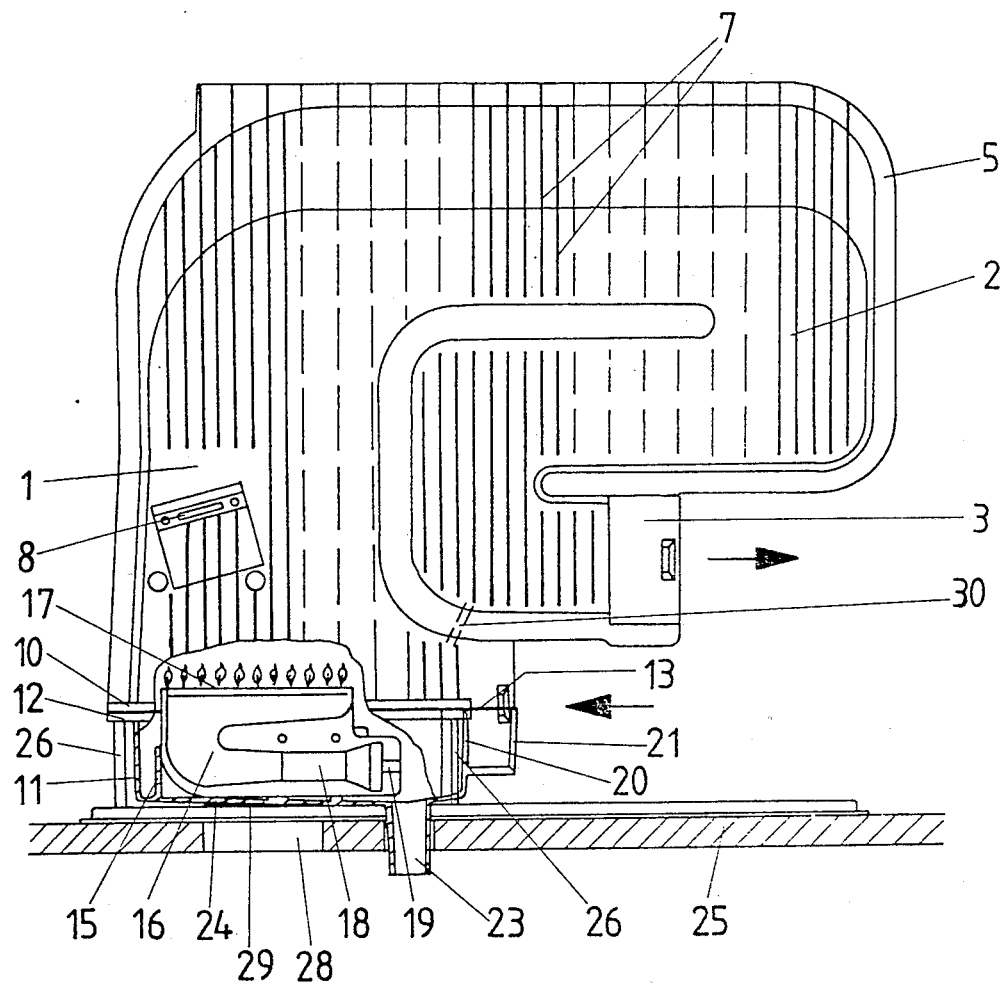
Figure 2:
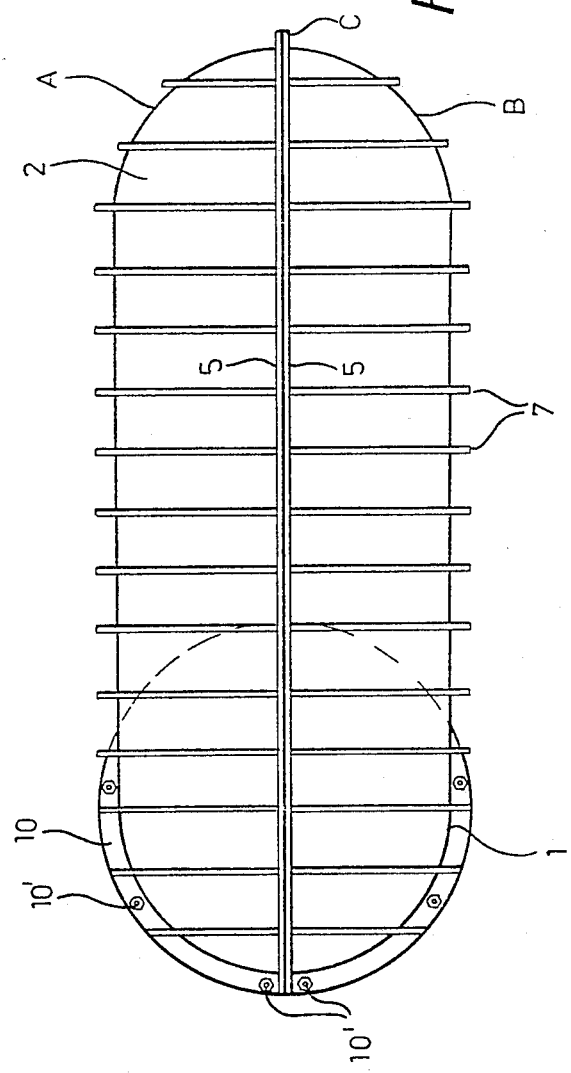
FIG. 2 is a diagrammatic plan view of the space heater.

The space heater of the invention comprises a heater body having an upwardly extending combustion chamber 1 of metal, i.e. a material of high thermal conductivity, which communicates at its upper end with a meander-shaped downwardly extending heat exchanger 2 terminating in a horizontally extending flue-gas discharge connecting sleeve 3. The assembly is formed from two parts A and B joined together along a seam C and thus each of the parts is constituted as a shell. A weld may sealingly connect the two shells and this weld may be formed along an outwardly extending flange 5 of each of the parts, the joined flanges 5 defining a heat exchange rib in a vertical plane. In place of welding, the two shells can be joined by interposing between the flanges 5 a sealing compound or strip and securing the flanges together by rivets also in vertical planes. Each of these shells has respective ribs 7 which have been illustrated only diagrammatically in FIG. 1, these ribs serving to strengthen the shell structure and to improve the heat exchange with ambient air.

The combustion chamber 1 is also provided with an inclining viewing window 8 through which the flame can be seen and which serves for flame control.

The combustion chamber terminates at its lower end in mounting flange 10 which can be bolted via bolts 10', for example, to a connecting flange 12 which extends outwardly on the upper rim of a bottom tray or tray bottom 11, a flame- and fire-resistant sealing layer and gasket 13 being disposed between these flanges. The bolts or nuts 10' forming the means for securing the flanges together may form part of posts 26 upon which the tray bottom 11 and the combustion chamber mounted thereon are elevated above a base plate 25 and thus raised above the floor of the chamber to be heated.

The bolt connection also facilitates mounting or separation of the chamber from the tray bottom thereby facilitating repair.

The tray bottom 11, which is closed on all sides, is provided with internal centering and mounting members 15 for properly positioning and holding a burner 16 which can be fired with a gaseous fuel or a gasified or gasifiable fuel, the flame grill 17 of the burner projects somewhat into the combustion chamber from below and its nozzle-shaped burner tube 18 can lie above the bottom of the tray and can be connected to a horizontally extending gas inlet 19 which opens to the wall of the tray in the region of an air-feed opening 20 defined by a combustion-air-pipe-connecting sleeve 21.

The air inlet and the sleeve are defined in part by the tray bottom and in part by the combustion chamber housing.

From the tray bottom, a condensate water outlet tube 23 can extend downwardly and in the embodiment illustrated is shown to pass through the floor of the chamber to be heated and through the base plate 25. In practice, this condensate outlet can also open laterally.

A further condensate passage 30 connectes the heat exchanger 2 with the combustion chamber above the tray bottom so that the latter will collect condensate from this passage as well.

While the tray can rest directly upon the floor, in the embodiment illustrated it rests upon the posts 26 which are provided on the base plate 25 and extend upwardly therefrom to engage the connecting flange 12. In this case, the bottom of the tray can have any desired configuration and can be provided, for example, with a pitch in the direction of the condensate outlet tube 23.

It has been found to be advantageous to provide the floor with an opening 28 communicating with the ambient atmosphere and to provide the base plate 25 with a rotary valve member 29 controlling the flow therethrough upwardly into the chamber to be heated to replace combustion air drawn into the inlet 20 when this inlet is not supplied from an air feed pipe. In the latter case, the valve 29 can control the rate at which air is replenished in the chamber. Note that the opening 28 is not dependent upon the position or orientation of the heater.

Figure 3:
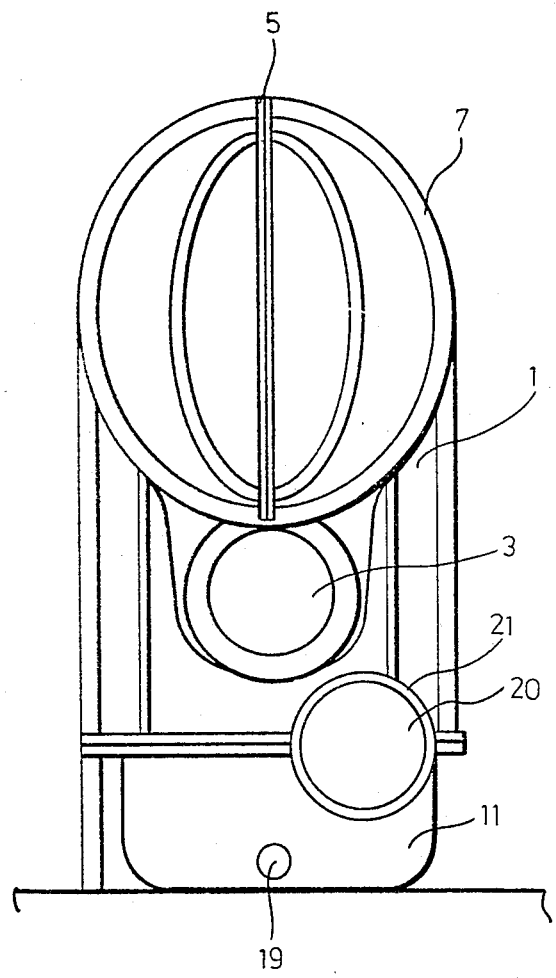
FIG. 3 is an end view of the space heater of FIG. 1 seen from the right-hand side thereof.

In the embodiment shown (see FIG. 3) the flue gas-connecting sleeve 3 and the combustion air inlet connecting sleeve 21 are somewhat offset but are turned in the same direction, the latter below the former so that pipes for removing the flue gas and supplying the combustion air can be mounted on a common housing and attached to the heater simultaneously or, in any event, the ducts can be connected to the device and disconnected therefrom at locations close to one another.

The flue-gas pipe can, of course, be a chimney extending through or over the roof and the air-supply duct can be passed upwardly at any distance from the heating device through another hole in the floor.

It is also possible, in accordance with the invention, to form both pipes in a box on the outer wall of the chamber to be heated and effectively to plug the sleeves 3 and 21 onto these pipes. Appropriate protection against the heat of the flue gas should be provided in this case. It should be apparent that, regardless of the particular arrangement for conducting the flue gas away or delivering the combustion air to the heating device, the versatility of the latter is greatly increased over prior-art systems since the heating device need not be limited to a fixed position in the chamber. Since the burner is mounted directly in the bottom tray and the latter can be reinforced for this purpose, assembly, mounting and repair are greatly simplified.

The invention is not limited to the embodiment illustrated and various modifications within the spirit and scope of the claims can be foreseen. For example, the bottom tray can also be mounted directly on the floor or can be provided directly with formations enabling it to be mounted on the floor. The bottom tray can also be used with heating devices having other pipes of heat exchangers than the meander heat exchanger illustrated. When the viewing glass or window is inclined, a comparatively large area of glass can be disposed on narrow side of the device with considerable advantage over smaller windows.

I claim:

1. A space heater for small compartments which comprises:
    an upwardly open bottom tray having an outwardly extending connection flange at an upper rim thereof;

a burner received in said tray, said tray being formed with a lateral air inlet opening; and a heater body mounted on said tray, said heater body comprising an upwardly extending combustion chamber formed at a lower end with an outwardly extending mounting flange coextensive with and secured to said connection flange, and a heat exchanger communicating with said combustion chamber having a downwardly extending portion and formed with a flue-gas outlet.

2. The space heater defined in claim 1 wherein said tray is provided with means for centering and securing said burner in said tray.

3. A space heater for small compartments which comprises:

an upwardly open bottom tray having an outwardly extending connection flange at an upper rim thereof;

a burner received in said tray, said tray being formed with a lateral air inlet opening; and a heater body mounted on said tray, said heater body comprising an upwardly extending combustion chamber formed at a lower end with a mounting flange secured to said connection flange, and a heat exchanger communicating with said combustion chamber having a downwardly extending portion and formed with a flue-gas outlet, said tray being provided with means for centering and securing said burner in said tray, said air inlet opening being formed in part by said tray and by a wall of said combustion chamber, an air inlet connecting sleeve being provided in said inlet.

4. The space heater defined in claim 3, further comprising a base plate having upstanding posts engaging the connection flange and supporting said tray and said body on said base plate.

5. The space heater defined in claim 4 wherein said base plate is formed with an opening having valve means.

6. The space heater defined in claim 3 wherein said bottom tray is formed with a water condensate outlet.

7. The space heater defined in claim 3, further comprising an inclined viewing window on said combustion chamber to enable viewing of a flame from said burner.

8. The space heater defined in claim 3 wherein said body is ribbed.

9. The space heater defined in claim 8 wherein said body is composed of two shells joined together along a seam.

10. A space heater for small compartments which comprises:

an upwardly open bottom tray having an outwardly extending connection flange at an upper rim thereof;

a burner received in said tray, said tray being formed with a lateral air inlet opening; and a heater body mounted on said tray, said heater body comprising an upwardly extending combustion chamber formed at a lower end with a mounting flange secured to said connection flange, and a heat exchanger communication with said combustion chamber having a downwardly extending portion and formed with a flue-gas outlet, said tray being provided with means for centering and securing said burner in said tray, said tray being provided with means enabling said tray to be supported directly on a floor.

* * * * *